United States Patent [19]

Haase

[11] Patent Number: 5,405,036

[45] Date of Patent: Apr. 11, 1995

[54] CYLINDRICAL LARGE LIQUID CONTAINER IN THE FORM OF A MULTIPART TANK

[75] Inventor: Harry Haase, Grossenaspe, Germany

[73] Assignee: Haase Tank GmbH, Neumunster, Germany

[21] Appl. No.: 46,261

[22] Filed: Apr. 6, 1993

[51] Int. Cl.⁶ .............................................. B65D 87/00
[52] U.S. Cl. ..................................... 220/4.13; 220/565
[58] Field of Search .................... 220/4.12, 4.13, 445, 220/565

[56] References Cited

U.S. PATENT DOCUMENTS

| | | | |
|---|---|---|---|
| 3,241,701 | 3/1966 | Boggs | 220/4.13 |
| 4,036,390 | 7/1977 | Morse | 220/4.13 X |
| 4,655,367 | 4/1987 | Palazzo | 220/445 |
| 4,744,137 | 5/1988 | Palazzo | 220/445 X |
| 4,821,915 | 4/1989 | Mayer | 220/4.12 X |
| 5,024,715 | 6/1991 | Trussler | 220/445 X |
| 5,102,005 | 4/1992 | Trussler | 220/4.13 X |
| 5,158,201 | 10/1992 | Bartlow | 220/445 X |

*Primary Examiner*—Steven M. Pollard
*Attorney, Agent, or Firm*—Fay, Sharpe, Beall, Fagan, Minnich & McKee

[57] ABSTRACT

In a large multipart liquid container a cylinder lining wall is formed from glass fiber reinforced plastic, can be connected to a bottom part and a cover to form a liquid-tight tank, and is constructed at least from thoroughly cured, prefabricated flexible-stiff mat material which can be rolled up under pretension as a transport item of a smaller diameter than the final diameter of the finished container to be passed through narrow wall openings. The cylinder wall can be put together from two molded parts, of which a first corresponds to the dimensions of the finished container and the other has a length shortened in comparison with the first to correspond to the smaller inside diameter, as a double wall and thus can be worked on in situ to form the finished container by connecting to at least one bottom part and cover.

18 Claims, 1 Drawing Sheet

CYLINDRICAL LARGE LIQUID CONTAINER IN THE FORM OF A MULTIPART TANK

BACKGROUND OF THE INVENTION

1. Field of the Invention

The invention relates to a cylindrical large liquid container in the form of a multipart tank, the cylinder lining wall of which is formed from glass fiber reinforced plastic and can be connected to a bottom part and a cover to form a liquid-tight tank.

2. Prior Art

A large liquid container is known (German Offenlegungsschrift 3,430,996) in which the wall is produced by winding, spraying or a combination of the two on a mold which can be collapsed or folded together and the mold is subsequently removed from the interior of the container. The curing process of the glass fiber reinforced plastic is interrupted after partial gelling of the same, whereupon the mold is removed and the wall is folded together by removing air from the interior of the container. The wall is packed by applying or wrapping around it an opaque covering, is transported to the place where the container is to be used and is set up by introducing air into the interior of the container. Thereafter, the curing process is completed by the action of UV radiation. Consequently, a significant reduction in the transporting and storing volume for the wall of the large liquid container is achieved.

However, the production process of a wall formed in this way is elaborate, and packing requires care in order not to set off the curing process to final solidity inadvertently by the incidence of light. In addition, the setting up of a container with a wall prepared in this way is complicated and requires considerable skill on the part of the workers. Furthermore, it is relatively laborious, since the cover generally cannot be placed until the wall has fully cured, in order to avoid possible deformations.

3. Objects of the Invention

Against this background, it is a primary object of the invention to provide a large liquid container in the form of a multipart tank of which at least the cylinder lining wall consists of glass fiber reinforced plastic, which can be set up simply, quickly and uncomplicatedly without additional measures for curing the cylinder lining wall.

It is a further important object of the invention to propose a liquid-receiving tank of substantial size which may be assembled *inter alia* in rooms to which the entrance is smaller than the dimension of the set-up container. It is yet another object of the invention to suggest a tank of the type indicated presenting improved safety against leakage.

SUMMARY OF THE INVENTION

These objects are achieved in the case of a large liquid container of the type described at the beginning of the specification by the cylinder lining wall being constructed at least from thoroughly cured, prefabricated and thus "flexible-stiff" mat material, i.e. material which is sufficiently stiff to form a rigid wall and yet flexible enough to be rolled up under pretension as a transport item of a smaller diameter than the final diameter of the finished container which can be put together from two molded parts, of which a first corresponds to the dimensions of the finished container and the other has a length shortened in comparison with the first to correspond to the smaller inside diameter as a double wall, and which thus can be worked on in situ to form the finished container by connecting them to at least one bottom part and to cover.

Consequently, it is possible to prepare cylinder lining walls for the setting up of a large liquid container which are distinguished by a clearly smaller storing and transporting volume with respect to the dimensions of the fitted-together, finished container, whereby the transporting and storing costs can be significantly reduced at the same time. Additionally, by preparing the walls in a completely cured form, a facilitated way of completing the operation to form a finished container is achieved. Such a container can subsequently be set up simply, quickly and uncomplicatedly even in rooms of which the entrance dimensions are significantly smaller than the dimensions of the finished container. The large liquid container provided is to a great extent leak proof and is distinguished by presenting little hazard to the environment.

A further increase in the leakproofness of the stored liquid can be achieved by at least the first, longer molded part being provided on its outer side with spacers such as studs, pegs, burlings or the like. Consequently, a control space, which can be monitored and by which any leaking of one of the walls can be indicated, is produced between the walls. This can be achieved, for example, by evacuating the air located between the walls, the subatmospheric pressure which results being monitored permanently by a measuring instrument. This very reliable leakage indication system means that it is also possible to dispense with the otherwise-required collecting pen for a tank containing fuels, allowing additional costs to be saved.

Advantageously, the molded parts forming the cylinder lining wall may be provided as material parts produced on a flat laminating board, wound up onto a mandrel of smaller diameter than the final diameter of the finished container for the purpose of preforming, held on the mandrel and cured on it by heat and time to final solidity. This provides cylinder lining walls which have a pretension and can be set up simply and uncomplicatedly to form the cylinder walls of the container and can be connected at a seam without measures for further increasing the solidity, for example by further curing, becoming necessary.

The cylinder lining wall may be held on the mandrel under pretension during curing by auxiliary tensioning means, for example by tensioning straps. It is ensured by the use of the tensioning straps that the cylinder wall produced remains wound-up on the mandrel and the desired pretension commences during the curing or crosslinking process.

Advantageously, the cylinder lining wall may be provided as a transport item wound in the manner of a roll of carpet to form a transporting roll after curing of the material and removal from the mandrel. The transporting roll may in this case have an inside diameter smaller than the outside diameter of the mandrel, and the cylinder lining wall may be kept at the consequently smaller diameter by auxiliary tensioning means, for example by tensioning straps. Consequently, the transporting volume for the cylinder lining walls is further minimized. With such a roll, even rooms to which the entrance or door is smaller than the dimension of the set-up container can be equipped with a large liquid container according to the invention.

In order to achieve optimum utilization of the transporting space, in particular if long distances have to be covered to various places of use, a plurality of cylinder lining walls may be wound to form a transporting roll and held by auxiliary tensioning means, for example by tensioning straps. When a place of use is reached, depending on what is needed, the required number of cylinder lining walls can be taken from this large transporting roll, which is thus used in the manner of a collective package or item.

BRIEF DESCRIPTION OF THE DRAWINGS

Other and further objects of the present invention will be apparent from the following description and claims and are illustrated in the accompanying drawings which by way of illustration schematically show a preferred embodiment of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawing, by way of a diagrammatic representation.

DETAILED DESCRIPTION OF THE DRAWINGS

Figure 3:
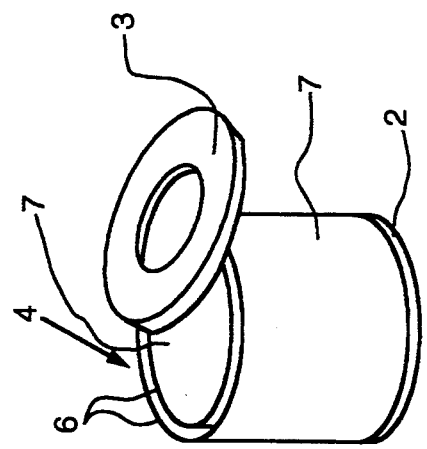
FIG. 3 shows a tank/container formed according to the present invention.
Figure 2:
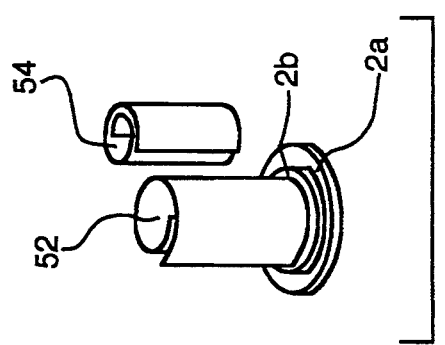
FIG. 2 shows a stage of assembly.
Figure 1:
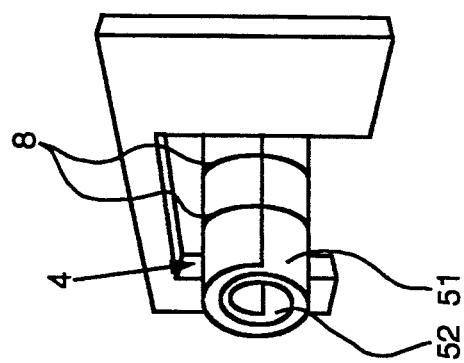
FIG. 1 shows parts of the wall of a container, in an unassembled transport condition.

As shown in FIGS. 1–3a large liquid container 1 has a bottom 2 that comprises two bottom parts 2a and 2b, a cover 3 and two cylinder lining walls 7 of glass fiber reinforced plastic. The parts are produced separately and transported into the desired room for setting up the container 1. The parts essentially determining the volume of the container, namely the cylinder lining walls 7, are delivered wound-up to form a transporting roll 4 comprising the molded parts 51, 52 of a diameter of about 70 cm. The cylinder lining walls 7 are completely cured and consequently have the necessary final stability.

Each cylinder lining wall 7 is produced as follows: a mechanical laminating apparatus is used to produce a laminate, at least 3 mm thick, on a flat laminating board, about 2.5 m wide and about 19.5 m long, between two thermoplastic sheets by alternate application of layers of resin and three plies of textile glass mat and a nonwoven layer. The forming and trimming of the lining laminates takes place at the earliest possible time by immediately rolling up for the purpose of deforming on a mandrel of a diameter of about 1 m. Each cylinder lining wall 7 is temporarily stored on this mandrel and is cured by time and heat to final solidity. During the temporary storage, the lining laminate is fixed on the mandrel by tensioning straps. After curing on the mandrel, the cylinder lining walls 7 intended for producing a large liquid container 1 are wound in the respectively desired length to form a transporting roll 4, fixed by tensioning straps 8 and transported to the room in which the large liquid container 1 is to be set up. In this room, each cylinder lining wall 7 is brought to the desired diameter (about 1.9 m). The two mutually opposite longitudinal edges of each cylinder lining wall 7 are connected to each other in a sealing manner by a laminate bond.

To produce a double-walled large liquid container 1, two bottom plates 2a/2b and two cylinder lining walls 7, one of which in each case is provided with studs, are required. One of the cylinder lining walls 7 is then prefabricated on a laminating board which has recesses for the molding on of the studs or pegs.

Assembly to obtain the finished, double-walled large liquid container 1 is realized as follows. First of all the bottom plate 2a for the outer container is positioned at the desired place. The second bottom plate 2b, of smaller diameter, for the inner container is placed centrally thereupon. Studs acting as spacers are introduced between the two bottom plates 2a and 2b. These studs are molded onto at least one of the bottom plates 2a or 2b. The inner cylinder lining wall 7 is fitted onto the smaller bottom plate 2b and connected in a sealing manner to the latter. Thereafter, the same procedure is followed with the outer cylinder lining wall 7, this being connected to the larger bottom plate 2a. After placing the cover 3 onto both cylinder lining walls 7 and establishing a seal, subatmospheric pressure is generated in the space between the walls and permanently monitored by a measuring instrument acting as a leakage warning device. In the event of one of the containers leaking, the pressure in the space between the double-lining wall 6 increases and an alarm is set off, so that precautions for repairing the defective location of the large liquid container 1 can be taken in good time.

What is claimed is:

1. A large liquid container in the form of a multipart tank, said container comprising
    a) a cylinder lining wall formed from glass fiber-reinforced plastic;
    b) a bottom part; and,
    c) a cover;
    said cylinder lining wall, said bottom part and said cover being connected to form a liquid-tight tank;
    the cylinder lining wall being constructed at least from prefabricated, thoroughly cured and thus sufficiently stiff yet flexible mat material which can be rolled up under pretension as a transport item of a diameter which is less than the final diameter of the finished container; the cylinder lining wall being able to be put together as a double wall from two molded parts, a first molded part corresponding to the dimensions of the finished container and a second molded part having a length shorter than that of said first molded part to correspond to the smaller inside diameter of said container;
    said cylinder lining wall being able to be worked on in situ to form the finished container by connecting each of said two molded parts to at least one of said bottom part and said cover;
    wherein said molded parts forming said cylinder lining wall are provided as material parts produced on a flat laminating board, wound up onto a mandrel of smaller diameter than the final diameter of the finished container, for the purpose of preforming said cylindrical lining wall with a built in pretension, held on said mandrel and cured on said mandrel by heat and time to final solidity.

2. A container as claimed in claim 1, wherein at least one of said first, longer molded part is provided on its inner side and said second, shorter molded part is provided on its outer side with spacers.

3. A container as claimed in claim 2, wherein said spacers are at least one of studs, pegs and burlings.

4. A container as claimed in claim 2, wherein said molded parts forming said cylinder lining wall are provided as material parts produced on a flat laminating board, wound up onto a mandrel of smaller diameter than the final diameter of the finished container, for the purpose of preforming said cylindrical lining wall, held on said mandrel and cured on said mandrel by heat and time to final solidity.

5. A container as claimed in claim 4, wherein said cylinder lining wall is held on the mandrel during curing by auxiliary tensioning means.

6. A container as claimed in claim 1, wherein said cylinder lining wall is held on the mandrel during curing by auxiliary tensioning means.

7. A container as claimed in claim 1, wherein said cylinder lining wall is provided as a transport item wound up in the manner of a roll of carpet to form a transporting roll after curing of the material and removal of the cured material from the mandrel.

8. A container as claimed in claim 7, wherein said transporting roll has an inside diameter smaller than the outside diameter of the mandrel and said cylinder lining wall is kept at the consequently smaller diameter by auxiliary tensioning means.

9. A container as claimed in claim 8, wherein a plurality of cylinder lining walls are wound to form a transporting roll and held by auxiliary tensioning means.

10. A container as claimed in claim 9, wherein said auxiliary tensioning means are tensioning straps.

11. A container as claimed in claim 8, wherein said auxiliary tensioning means are tensioning straps.

12. A container as claimed in claim 7, wherein a plurality of cylinder lining walls are wound to form a transporting roll and held by auxiliary tensioning means.

13. A container as claimed in claim 12, wherein said auxiliary tensioning means are tensioning straps.

14. A large liquid container in the form of a multipart tank, said container comprising
a) a cylinder lining wall formed from glass fiber-reinforced plastic;
b) a bottom part; and,
c) a cover;
said cylinder lining wall, said bottom part and said cover being connected to form a liquid-tight tank;
the cylinder lining wall being constructed at least from prefabricated, thoroughly cured and thus sufficiently stiff yet flexible mat material which can be rolled up under pretension as a transport item of a diameter which is less than the final diameter of the finished container; the cylinder lining wall being able to be put together as a double wall from two separate and unconnected molded parts, a first molded part corresponding to the dimensions of the finished container and a second molded part having a length shorter than that of said first molded part to correspond to the smaller inside diameter of said container;
said cylinder lining wall being able to be worked on in situ to form the finished container by separately connecting each of said two molded parts to at least one of said bottom part and said cover;
wherein said molded parts forming said cylinder lining wall are provided as material parts produced on a flat laminating board, wound up onto a mandrel of smaller diameter than the final diameter of the finished container, for the purpose of preforming said cylindrical lining wall with a built in pretension, held on said mandrel and cured on said mandrel by heat and time to final solidity.

15. A container as claimed in claim 14, wherein at least one of said first, longer molded part is provided on its inner side and said second, shorter molded part is provided on its outer side with spacers.

16. A container as claimed in claim 14, wherein said cylinder lining wall is provided as a transport item wound up in the manner of a roll of carpet to form a transporting roll after curing of the material and removal of the cured material from the mandrel.

17. A container as claimed in claim 16, wherein a plurality of cylinder lining walls are wound to form a transporting roll and held by auxiliary tensioning means.

18. A container as claimed in claim 17, wherein said auxiliary tensioning means are tensioning straps.

* * * * *